US008660338B2

United States Patent
Ma et al.

(10) Patent No.: US 8,660,338 B2
(45) Date of Patent: Feb. 25, 2014

(54) WIDE BASELINE FEATURE MATCHING USING COLLOBRATIVE NAVIGATION AND DIGITAL TERRAIN ELEVATION DATA CONSTRAINTS

(75) Inventors: Yunqian Ma, Plymouth, MN (US); Benjamin Mohr, St. Louis Park, MN (US)

(73) Assignee: Honeywell International Inc., Morristown, NJ (US)

( * ) Notice: Subject to any disclaimer, the term of this patent is extended or adjusted under 35 U.S.C. 154(b) by 556 days.

(21) Appl. No.: 13/053,777

(22) Filed: Mar. 22, 2011

(65) Prior Publication Data

US 2012/0243775 A1    Sep. 27, 2012

(51) Int. Cl.
*G06K 9/00* (2006.01)

(52) U.S. Cl.
USPC .......................................... 382/154

(58) Field of Classification Search
None
See application file for complete search history.

(56) References Cited

U.S. PATENT DOCUMENTS

| | | | |
|---|---|---|---|
| 5,179,441 A | 1/1993 | Anderson et al. | |
| 5,432,712 A | 7/1995 | Chan | |
| 6,853,332 B1 | 2/2005 | Brookes | |
| 6,885,334 B1 | 4/2005 | Hager et al. | |
| 7,409,293 B2 | 8/2008 | Hager et al. | |
| 7,698,108 B2 | 4/2010 | Haney et al. | |
| 7,725,253 B2 | 5/2010 | Foxlin | |
| 7,821,453 B2 | 10/2010 | Wu et al. | |
| 7,831,094 B2 | 11/2010 | Gupta et al. | |
| 2003/0210180 A1* | 11/2003 | Hager et al. | 342/165 |
| 2005/0216182 A1 | 9/2005 | Hussain et al. | |
| 2007/0291130 A1 | 12/2007 | Broggi et al. | |
| 2008/0247668 A1 | 10/2008 | Li et al. | |
| 2008/0312833 A1 | 12/2008 | Greene et al. | |
| 2008/0316089 A1* | 12/2008 | Forgrieve et al. | 342/191 |
| 2009/0125223 A1 | 5/2009 | Higgins | |
| 2009/0232358 A1 | 9/2009 | Cross | |
| 2010/0017046 A1 | 1/2010 | Cheung et al. | |
| 2010/0080469 A1 | 4/2010 | Liu et al. | |
| 2010/0195914 A1 | 8/2010 | Isard et al. | |
| 2010/0268458 A1* | 10/2010 | Becker et al. | 701/208 |

(Continued)

OTHER PUBLICATIONS

U.S. Patent and Trademark Office, "Advisory Action", from U.S. Appl. No. 13/053,811, Oct. 25, 2013, pp. 1-3, Published in: US.

(Continued)

*Primary Examiner* — Jason M Repko
*Assistant Examiner* — Jhere Rowland
(74) *Attorney, Agent, or Firm* — Fogg & Powers LLC

(57) ABSTRACT

A method for wide baseline feature matching comprises capturing one or more images from an image sensor on each of two or more platforms when the image sensors have overlapping fields of view, performing a 2-D feature extraction on each of the captured images in each platform using local 2-D image feature descriptors, and calculating 3-D feature locations on the ellipsoid of the Earth surface from the extracted features using a position and attitude of the platform and a model of the image sensor. The 3-D feature locations are updated using digital terrain elevation data (DTED) as a constraint, and the extracted features are matched using the updated 3-D feature locations to create a common feature zone. A subset of features from the common feature zone is selected, and the subset of features is inputted into a collaborative filter in each platform. A convergence test is then performed on other subsets in the common feature zone, and falsely matched features are pruned from the common feature zone.

20 Claims, 6 Drawing Sheets

(56) References Cited

U.S. PATENT DOCUMENTS

| | | | |
|---|---|---|---|
| 2010/0274481 A1* | 10/2010 | Krishnaswamy et al. | .... 701/208 |
| 2010/0303340 A1 | 12/2010 | Abraham et al. | |
| 2012/0245844 A1 | 9/2012 | Lommel et al. | |
| 2012/0257050 A1* | 10/2012 | Simon | ........................ 348/135 |

OTHER PUBLICATIONS

Frew, "Flight Demonstrations of Self-directed Collaborative Navigation of Small Unmanned Aircraft", Sep. 2004, pp. 1-14, Publisher: American Institute of Aeronautics and Astronautics.

Knuth et al., "Distributed Collaborative Localization of Multiple Vehicles from Relative Pose Measurements", "47th Annual Allerton Conference on Communication, Control, and Computing", Jun. 2009, pp. 314-321, Publisher: Allerton, Published in: Monticello, IL.

Riley et al., "Situation Awareness in HRI with Collaborating Remotely Piloted Vehicles", "Proceedings of the Human Factors and Ergonomics Society 49th Annual Meeting", Sep. 2005, pp. 407-411, Publisher: Human Factors and Ergonomics Society.

"Vision Based Navigation and Precision/Dynamic Targeting for Air Vehicles (ImageNav)", "Available at www.virtualacquisitionshowcase.com/document/1301/briefing accessed Mar. 3, 2011", Nov. 2, 2009, pp. 15, Publisher: Scientific Systems Company, Inc.

European Patent Office, "Office Action", from Foreign Counterpart of U.S. Appl. No. 13/053,811, Nov. 5, 2012, pp. 18, Published in: EP.

Ingvalson, "Shared State Selection and Data Exchange for Collaborative Navigation Using Conditionally Independent Parallel Filters", "U.S. Appl. No. 13/672,337", filed Nov. 8, 2012, pp. 140, Published in: US.

Ingvalson, "Data Sharing Among Conditionally Independent Parallel Filters", "U.S. Appl. No. 13/679,170", filed Nov. 16, 2012, pp. 125.

European Patent Office, "European Search Report", mailed Aug. 28, 2012, pp. 1-4, Published in: EP.

Das et al., "Robust Visual Path Following for Heterogeneous Mobile Platforms", "2010 IEEE International Conference on Robotics and Automation", May 2010, pp. 2431-2437.

Fallon et al., "A Measurement Distribution Framework for Cooperative Navigation using Multiple AUV's", "2010 IEEE International Conference on Robotics and Automation", May 2010, pp. 4256-4263.

Spenneberg et al, "Exploration of Underwater Structures with Cooperative Heterogeneous Robots", Jun. 2005, pp. 782-786, vol. 2.

European Patent Office, "Office Action", Sep. 11, 2012, pp. 17, Published in: EP.

U.S. Patent and Trademark Office, "Final Office Action", "U.S. Appl. No. 13/053,811", Jul. 24, 2013, pp. 1-15.

U.S. Patent and Trademark Office, "Office Action", "U.S. Appl. No. 13/053,811", Apr. 16, 2013, pp. 1-18.

Brown, Alison and Paul Olson, "Navigation and Electro-Optic Sensor Integration Technology for Fusion of Imagery and Digital Mapping Products", "Symposium on Vector Moving Maps Display", Published in: Alexandria, VA, Aug. 1999.

Geyer et al., "The Recursive Multi-Frame Planar Parallax Algorithm", "Proceedings of Third International Symposium on 3D Data Processing, Visualization and Transmission", 2006, Publisher: University of North Carolina, Published in: Chapel Hill, USA.

"Vision Based Navigation and Precision/Dynamic Targeting for Air Vehicles (ImageNav)", "Available at www.virtualacquisitionshowcase.com/document/1301/briefing accessed Mar. 3, 2011", Nov. 2, 2009, pp. 1-5, Publisher: Scientific Systems Company, Inc.

Tola et al, "Daisy: An Efficient Dense Descriptor Applied to Wide-Baseline Stereo", "IEEE Transactions on Pattern Analysis and Machine Intelligence", May 2010, pp. 815-830, vol. 32, No. 5, Publisher: IEEE.

European Patent Office, "Communication under Rule 71(3) EPC", "from Foreign Counterpart of U.S. Appl. No. 13/053,777", filed Mar. 5, 2013, pp. 127, Published in: EP.

\* cited by examiner

WIDE BASELINE FEATURE MATCHING USING COLLOBRATIVE NAVIGATION AND DIGITAL TERRAIN ELEVATION DATA CONSTRAINTS

BACKGROUND

Feature extraction and feature matching for short baseline stereo (2 cameras) is well studied. For example, several Speed-Up Robust Features (SURF) can be extracted for two images from two (short baseline) cameras, and the feature matches can be based on the Mahalanobis distance or Euclidean distance of the SURF descriptors in the two images.

In an application of Global Positioning System (GPS) denied navigation systems, there are two or more moving platforms. Each platform has an inertial measurement unit, which use a combination of accelerometers and gyroscopes. Also, an electro-optical (EO) sensor such as a camera is mounted on each moving platform. The two cameras can share the same field of view, that is, the cameras on two of the vehicles can observe common landmarks. The communication between the two or more moving platforms can enable the collaborative navigation and improve the wide baseline feature matching.

For two cameras, the baseline is the line joining the camera centers. For a short baseline of two moving cameras, a geometric constraint can be used. Some geometric constraints can exploit the epipolar geometry. Some geometric constraints can use the inertial measurement to represent the moving camera, if the inertial sensor and the camera sensor are mounted together.

In a wide baseline situation, where two cameras are widely separated, existing feature matching approaches are not appropriate because they are not robust to perspective distortions, and increased occluded areas. Thus, various technical challenges exist in wide baseline feature matching that need to be addressed.

One existing approach for wide baseline feature matching uses pixel differencing (or correlation) on a small window instead of a large window, and thereafter uses graph-cuts and partial differential equations to emphasize spatial consistency. However, when the image quality or resolution is not good enough, and illumination changes, this method will fail. Another existing wide baseline feature matching approach uses small feature sets, and triangulation for feature matching, and after that uses local rectifying of the image features. This approach is highly dependent on the small feature sets and the triangulation, which can be problematic.

SUMMARY

A method for wide baseline feature matching comprises capturing one or more images from an image sensor on each of two or more platforms when the image sensors have overlapping fields of view, performing a two-dimensional (2-D) feature extraction on each of the captured images in each platform using local 2-D image feature descriptors, and calculating three-dimensional (3-D) feature locations on the ellipsoid of the Earth surface from the extracted features in each platform using a position and attitude of the platform and a model of the image sensor. The 3-D feature locations are updated in each platform using digital terrain elevation data (DTED) as a constraint, and the extracted features in each of the platforms are matched using the updated 3-D feature locations to create a common feature zone. A subset of features from the common feature zone is selected, and the subset of features is inputted into a collaborative filter in each platform. A convergence test is then performed on other subsets in the common feature zone, and falsely matched features are pruned from the common feature zone.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the drawings, in which.

DETAILED DESCRIPTION

Figure 1:
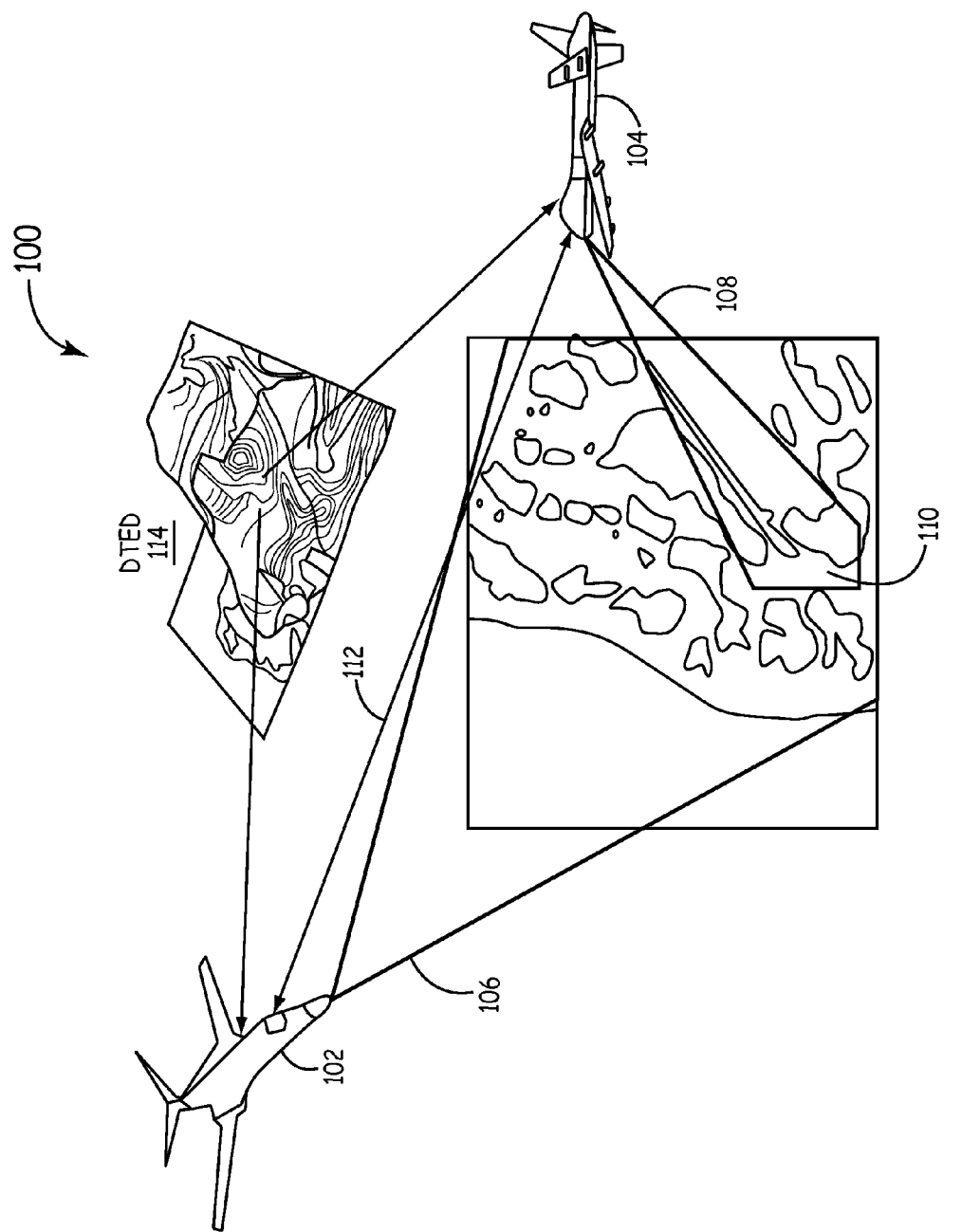
FIG. 1 illustrates an exemplary application environment for wide baseline feature matching using collaborative navigation.

In the following detailed description, reference is made to the accompanying drawings that form a part hereof, and in which is shown by way of illustration specific illustrative embodiments. It is to be understood, however, that other embodiments may be utilized and that logical, mechanical, and electrical changes may be made.

A method and system are provided for wide baseline feature matching using collaborative navigation and Digital Terrain Elevation Data (DTED) constraints. The method can be implemented by a wide baseline feature matching algorithm using DTED and collaborative filters, which share the same observations. The present approach facilitates collaborative, GPS-denied navigation of multiple vehicles.

In one embodiment, sensor feature matching in a wide baseline environment is provided. An image sensor such as an electro-optical (EO) sensor is mounted on two or more different vehicles, and the field of view of each image sensor shares the same observations. Feature extraction is then performed in each vehicle. The three-dimensional (3-D) feature points are calculated using vehicle position and a camera model, and constrained by DTED. The resulting 3-D feature location provide a geometric constraint to the feature matching of the extracted features in the two vehicles. An initial feature matching step utilizes a combination of spatial neighborhood and similarity of features. A small subset of features from a common feature zone is input to a collaborative filter in each vehicle. By observing the consistency of the other subset features in the common feature zone from the collaborative filters, the feature matching is updated.

The present method and system can use the DTED to resolve the vertical position of the 3-D landmark position. The DTED is a satellite-based survey of the Earth surface. One example of the vertical position can be implemented by intersecting the three dimensional DTED map with the landmark's image projection to the ellipsoid of the earth.

The present method and system can be implemented into navigation filters. One example of a navigation process is simultaneous localization and mapping (SLAM) for navigation of the vehicle and building a map of the environment simultaneously. Another navigation process uses an extended Kalman filter with the state vector, which includes the navigation parameters (position, velocity, and attitude), and a set of landmarks. The landmarks are modeled as stationary with respect to the earth. For example, in one implementation, the landmark can be tracked for a period of time to provide the navigation solution. A new landmark can then be added. The old landmark, which does not have correspondence features for a given period of time, will then be pruned from the state vector in the extended Kalman filter.

The present method and system can be employed with any grouping of navigation vehicle platforms, including air vehicle and ground vehicles. One example of a group of navigation platforms can have one high flier aircraft and one low flier aircraft. In this example, the low flier aircraft can be an unmanned aerial vehicle (UAV). Another example of a group of navigation platforms can have one air vehicle and one ground vehicle. In this example, the ground vehicle can bean unmanned ground vehicle, a tank, or the like.

The present method and system provide communication links between the navigation platforms. One example of a communication link can be a communication radio. The collaborative navigation between two or more platforms is through the communication link between the two or more platforms. When initial feature matching between the two or more platforms is initiated, the collaborative navigation filters can improve the feature matching for the two or more platforms.

FIG. 1 shows an exemplary application environment 100 for the present method, in which two vehicles are shown, including a high altitude aircraft 102 such as a jet and a low altitude aircraft 104 such as a UAV. At some point in time, a field of view 106 of aircraft 102 and a field of view 108 of aircraft 104 have an overlapping field of view 110. Radio ranging measurements are made between aircraft 102 and aircraft 104, and cameras on each of these vehicles can observe common landmarks on the terrain. Communication links also connect aircraft 102 and aircraft 104. These two vehicles can use shared information 112 to perform collaborative navigation. The shared information 112 can include range between the two vehicles, and the features extracted by each vehicle. In addition, Digital Terrain Elevation Data (DTED) 114 can be accessed by each vehicle.

Figure 2:
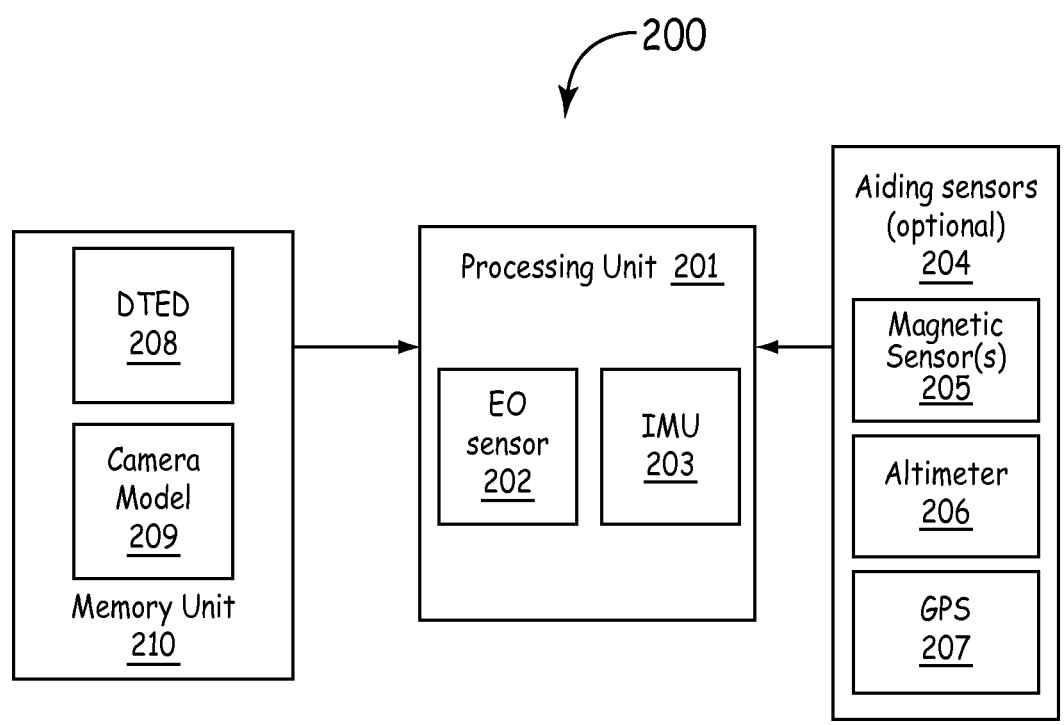
FIG. 2 is a block diagram of a platform configuration according to one embodiment.

FIG. 2 is depicts one embodiment of a platform 200 that can implement the present approach. The platform 200 such as a vehicle includes at least one processing unit 201 having at least one EO sensor 202 such as a digital camera, and at least one inertial measurement unit (IMU) 203 mounted on the vehicle. The IMU 203 is configured to provide data regarding the motion of platform 200. For example, in this embodiment, the IMU 203 includes three mutually orthogonal linear accelerometers and three mutually orthogonal gyroscopes to provide six channels of data. The IMU 203 provides the inertial motion data to processing unit 201. The frame rate of EO sensor 202 can be different from the sample rate from IMU 203. Optional aiding sensors 204 can be in operative communication with processing unit 201, and can include at least one magnetic sensor 205, an altimeter 206, and a global position system (GPS) receiver 207. In addition, a memory unit 210 contains DTED 208 and a camera model 209, which can be accessed by processing unit 201.

The present method and system can use the sensors in FIG. 2 to form the inertial navigation system. The inertial navigation system employs the inertial measurement unit and aiding sensors to generate the navigation states including position, velocity, and attitude. For example, the inertial navigation function uses the compensated sensor data ($\Delta v$ and $\Delta \theta$) in the body frame from the inertial sensor function to calculate the vehicle state including position, velocity, and attitude. The mechanism can be either a gimbaled platform or a strap-down unit. For example, the strap-down unit can be used in one embodiment.

One example of the navigation process uses a Kalman filter to perform the sensor fusion of the inertial measurement unit and the aiding sensor. For example, the Kalman filter uses additional aiding sensor measurements to remove the drift error of the inertial navigation results. Another exemplary navigation filter can be a particle filter, which can represent the nonlinear process model and non-Gaussian error distribution. More generic filters can be used as well.

The elevation data for the terrain can be represented by the DTED. There is a difference in elevation for different points in the ground. The DTED can be accessed by each platform.

Figure 3:
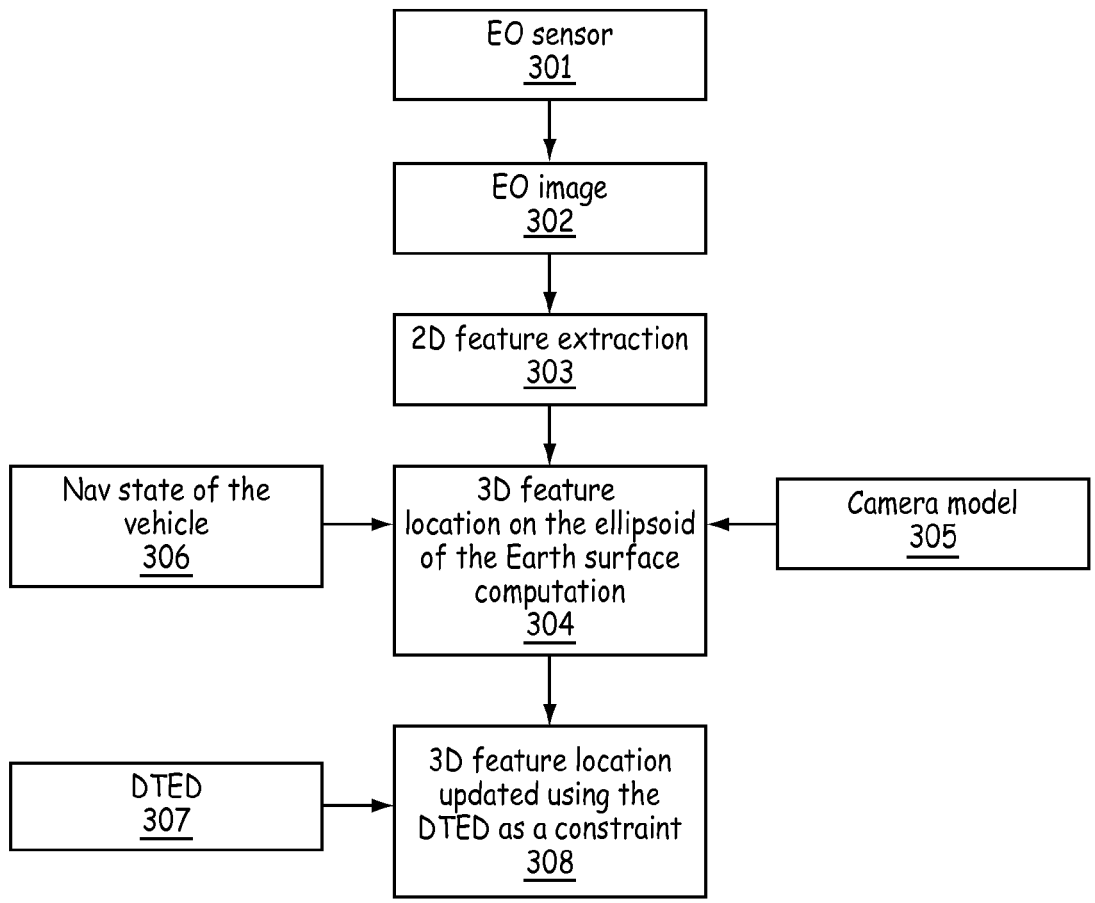
FIG. 3 is a flow diagram of a method for feature extraction and computing three-dimensional features.

FIG. 3 is a flow diagram of a method for feature extraction and computing 3-D features according to one approach. Initially, an EO sensor 301 on each vehicle captures one or more images 302 to be processed. A two dimensional (2-D) feature extraction process 303 is then performed in each vehicle. For example, a 2-D Speed-Up Robust Features (SURF) descriptor can be extracted at 303. Other local image feature descriptors can also be extracted, such as Scaled Invariant Features Transform (SIFT). In the 2-D feature extraction process, an 'interest point' such as corners or a T-junction is selected first. One approach for the interest point detection uses a Hessian-matrix approximation. After that, the neighborhood of every interest point is represented by a feature vector. For the SURF feature, a 4*4 sub-region can be used. For each sub-region a Haar wavelet responses at 5*5 regularly spaced sample points are calculated. Then the wavelet responses are summed up over each sub-region and form the entries in the feature vector. Depending on whether a four dimensional descriptor for each sub-region or an eight dimensional descriptor for each sub-region is used, a SURF-64 feature or a SURF-128 feature can be extracted.

The SURF feature descriptor can be matched using a distance between two SURF feature descriptors. The distance can be the Mahalanobis or Euclidean distance. For the multiple image frames collected by a single vehicle, the tracked feature points can be formed by finding the matched SURF feature descriptors between the successive image frames collected by the single vehicle. The tracked features can be included in the state vector of the Kalman filters of the navigation solution.

Each feature is associated with a physical 3-D point. For example, the scale of a scene can be uniquely determined using a ranging measurement between the two vehicles. Alternatively, a 3-D feature location on the ellipsoid of the Earth surface computation can be processed at 304 using a calibrated camera model 305 and a navigation state of the vehicle 306. The camera model 305 can include the focal length, principal point, skew coefficient, radial and tangential distortion parameters, etc. The navigation state of the vehicle has the position, velocity, and the attitude of the vehicle in the state vector. The altitude of the vehicle is also available. A DTED 307 is used as a constraint for a 3-D feature location update at 308. The landmark location can then be projected onto a DTED surface to generate a 3-D point feature with the DTED surface. One example is to intersect the three dimensional DTED map with the landmark's image projection to provide a good estimate of elevation.

Figure 4:
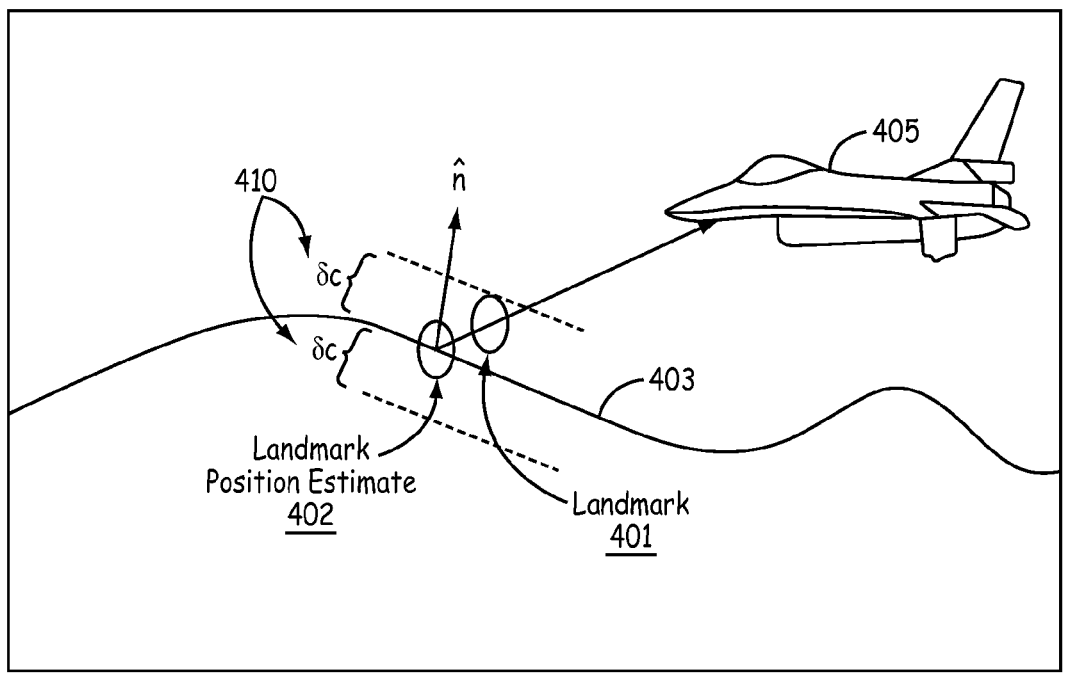
FIG. 4 is a schematic diagram illustrating an exemplary Digital Terrain Elevation Data (DTED) constraint used in aircraft navigation.

FIG. 4 illustrates an exemplary DTED constraint used in aircraft navigation. A landmark 401 is projected onto a DTED surface 403 by an aircraft 405 to generate an updated 3-D location 402 such as a landmark position estimate that is more accurate and robust than a monocular camera projection. The results of this projection may occasionally be erroneous due to the noise sensitivity of the 3-D structure computation from 2-D images. Each time a point is projected onto DTED surface 403, the result contains errors due to navigation uncertainties as well as uncertainties in the DTED structure—particularly when comparing visual features (e.g., tree tops, hill tops, etc.), to bare-earth DTED and sensor errors. FIG. 4 shows the bias ($\delta c$) 410 due to DTED map elevation uncertainty and unmodeled structure in bare-earth DTED. The parameter $\hat{n}$ represents the normal to the surface of the DTED.

Figure 5:
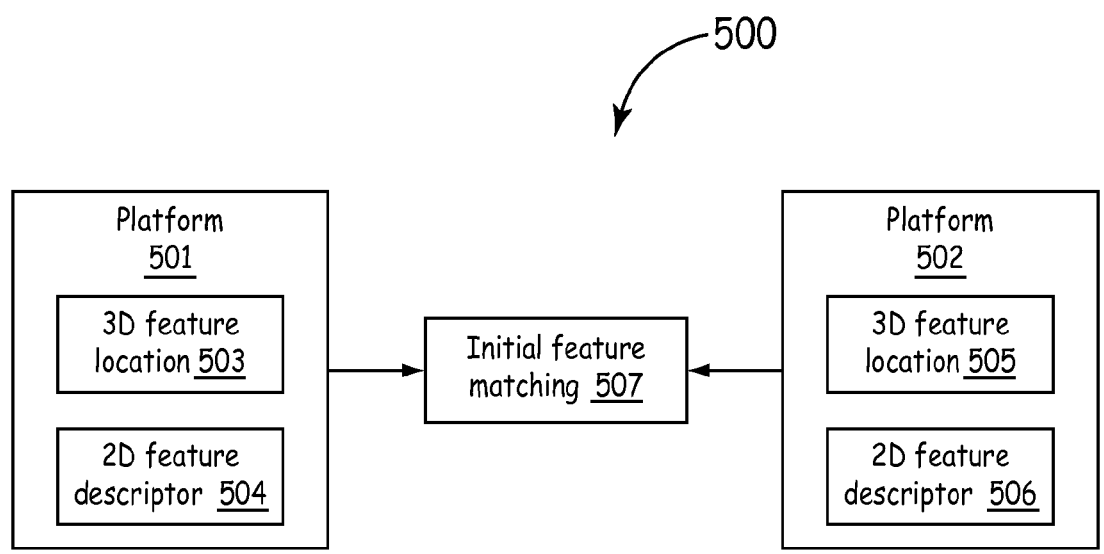
FIG. 5 is a flow diagram of a method for initial feature matching.

FIG. 5 is a flow diagram of a method 500 for initial feature matching using a combination of spatial neighborhood and similarity of feature appearance descriptors. A first platform 501 includes a 3-D feature location module 503 and a 2-D feature descriptor module 504. Likewise, a second platform 502 includes a 3-D feature location module 505 and a 2-D feature descriptor module 506. The initial feature matching is performed at 507 with data received from platforms 501 and 502 using small window feature matching. In particular, the 3-D feature locations computed in platform 501, and the 3-D feature locations computed in platform 502 provide a neighborhood searching area for the feature matching. Using this geometry constraint, the 2-D feature descriptors computed in modules 504 and 506, such as SURF features, are matched in the neighborhood.

In FIG. 5 (and FIG. 6 discussed hereafter), there is a communication link between the navigation platforms. One example of a communication link can be a communication radio. The collaborative navigation between the two platforms is through the communication between the two platforms. The initial feature matching in FIG. 5 is performed when the two platforms are within the communication range.

When the initial feature matching between two or more platforms is initiated, the collaborative navigation filter is established. The collaborative navigation can improve the feature matching. Using the collaborative navigation, the Kalman filter in one platform can use its own measurement and measurements from other platforms to enhance the navigation solution of all the platforms.

One example of the collaborative filters is to use the conditional update, which allows information to be exchanged directly between separate but partially correlated Kalman filters in the separate platforms. For the navigation filter in each platform, the states will include position, velocity, and attitude of the platform, the states required by the aiding sensor, and the landmark observed by the platform. The state of the collaborative filters can include the position, velocity, and attitude states of each of the two platforms involved, the landmark measurement, and the range measurement states shared between the two platforms.

Figure 6:
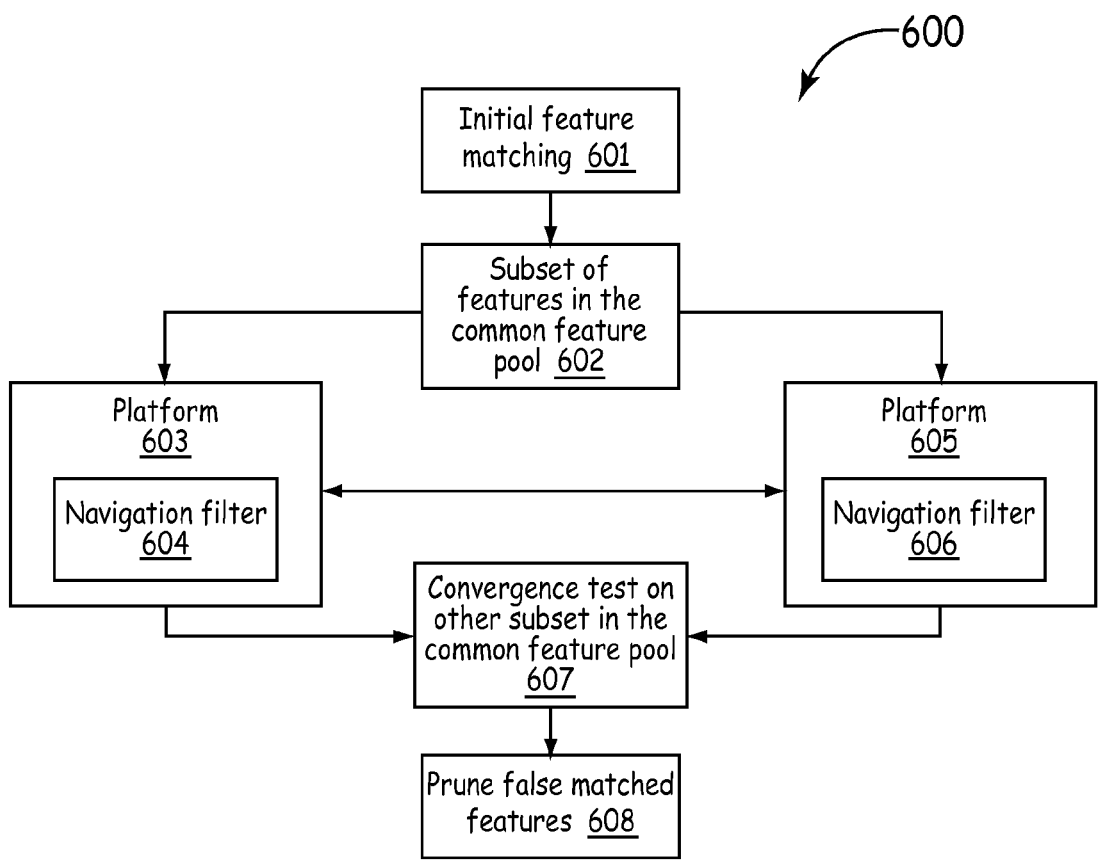
FIG. 6 is a flow diagram of a method for feature matching refinement using collaborative filters.

FIG. 6 is a flow diagram of a method 600 for feature matching refinement using collaborative filters, in which there is collaboration between a platform 603 and a platform 605 for pruning of falsely matched features. An initial feature matching is performed at 601 such as described above in FIG. 5, followed by choosing a subset of features in a common feature pool or zone at 602. The subset of features chosen at 602 is shared between individual platform navigation filters 604 and 606 in platforms 603 and 605, respectively. The navigation filters 604 and 606 act in a collaborative manner between platforms 603 and 605 to perform a conditional update using the subset of the same observation data set from 602, and 3-D feature points are shared by the two platforms. A convergence test on the other subset in the common feature pool is performed at 607, and the 3-D position of the other subset of the same observation dataset can be calculated. After that, there is a pruning of falsely matched features at 608 by observing whether the other subset of the datasets converges. Then the feature matching task can be completed.

Further details related to conditional updating by collaborative filters is described in U.S. Application Publication No. 2012/0245844, the disclosure of which is incorporated herein by reference. In method 600 all that is required is transmitting the shared elements of the state vector and covariance matrix to the collaborating platforms.

A computer or processor used in the present system and method can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include or function with software programs, firmware, or other computer readable instructions for carrying out various process tasks, calculations, and control functions used in the present method and system.

The present methods can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable computer readable storage media may include, for example, non-volatile memory devices including semiconductor memory devices such as EPROM, EEPROM, or flash memory devices; magnetic disks such as internal hard disks or removable disks; magneto-optical disks; CDs, DVDs, Blu-ray discs, or other optical storage disks; nonvolatile ROM, RAM, and other like media; or any other media that can be used to carry or store desired program code in the form of computer executable instructions or data structures.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method for wide baseline feature matching, the method comprising:
  capturing one or more images from an image sensor on each of two or more platforms when the image sensors have overlapping fields of view;
  performing a two-dimensional (2-D) feature extraction on each of the captured images in each platform using local 2-D image feature descriptors;
  calculating three-dimensional (3-D) feature locations on the ellipsoid of the Earth surface from the extracted features in each platform using a position and attitude of the platform and a model of the image sensor;
updating the 3-D feature locations in each platform using digital terrain elevation data (DTED) as a constraint;
matching the extracted features in each of the platforms using the updated 3-D feature locations to create a common feature zone;
selecting a subset of features from the common feature zone;
inputting the subset of features into a collaborative filter in each platform;
performing a convergence test on other subsets in the common feature zone; and
pruning falsely matched features from the common feature zone.

2. The method of claim 1, wherein the image sensor in each of the platforms comprises an electro-optical sensor.

3. The method of claim 1, wherein the platforms comprise two or more vehicles in motion and in operative communication with each other for collaborative navigation.

4. The method of claim 3, wherein the vehicles comprise a first aircraft at a higher altitude than a second aircraft.

5. The method of claim 1, wherein the 2-D feature extraction includes selecting one or more interest points, and representing a neighborhood of each interest point by a feature vector.

6. The method of claim 1, wherein the local image feature descriptors comprise speed-up robust features (SURF) descriptors or scaled invariant features transform (SIFT) descriptors.

7. The method of claim 1, wherein the matching of the extracted features uses a combination of spatial neighborhood and similarity of feature appearance descriptors.

8. The method of claim 7, wherein the 3-D feature locations calculated in each platform provide a neighborhood searching area for feature matching, and the 2-D image feature descriptors are matched in the neighborhood.

9. The method of claim 1, further comprising projecting one or more 3-D feature locations on the ellipsoid of the Earth surface onto a DTED surface to generate one or more 3-D point features on the DTED surface.

10. A computer program product, comprising:
a non-transitory computer readable medium having instructions stored thereon executable by a processor to perform a method for wide baseline feature matching, the method comprising:
capturing one or more images from an electro-optical sensor on each of two or more vehicles in operative communication with each other when the electro-optical sensors have overlapping fields of view;
performing a two-dimensional (2-D) feature extraction on each of the captured images in each vehicle using local 2-D image feature descriptors;
calculating three-dimensional (3-D) feature locations on the ellipsoid of the Earth surface from the extracted features in each vehicle using a position and attitude of the vehicle and a model of the electro-optical sensor;
updating the 3-D feature locations in each vehicle using digital terrain elevation data (DT ED) as a constraint;
matching the extracted features in each vehicle using the updated 3-D feature locations to create a common feature zone;
selecting a subset of features from the common feature zone;
inputting the subset of features into a collaborative filter in each vehicle;
performing a convergence test on other subsets in the common feature zone; and
pruning falsely matched features from the common feature zone.

11. The computer program product of claim 10, wherein the 2-D feature extraction includes selecting one or more interest points, and representing a neighborhood of each interest point by a feature vector.

12. The computer program product of claim 10, wherein the local image feature descriptors comprise speed-up robust features (SURF) descriptors or scaled invariant features transform (SIFT) descriptors.

13. The computer program product of claim 10, wherein the matching of the extracted features uses a combination of spatial neighborhood and similarity of feature appearance descriptors.

14. The computer program product of claim 10, wherein the 3-D feature locations calculated in each vehicle provide a neighborhood searching area for feature matching, and the 2-D image feature descriptors are matched in the neighborhood.

15. The computer program product of claim 10, wherein the method further comprises projecting one or more 3-D feature locations on the ellipsoid of the Earth surface onto a DTED surface to generate one or more 3-D point features on the DTED surface.

16. A system for wide baseline feature matching, the system comprising:
a first platform; and
a second platform in operative communication with the first platform;
wherein the first platform and the second platform each comprise:
at least one processing unit mounted on the platform;
at least one electro-optical sensor mounted on the platform and operatively coupled to the processing unit;
at least one inertial measurement unit mounted on the platform and operatively coupled to the processing unit;
a least one navigation filter operatively coupled to the processing unit; and
a memory unit operatively coupled to the processing unit, the memory unit containing digital terrain elevation data (DTED) and a model of the electro-optical sensor, the memory unit including machine readable instructions executable by the processing unit to:
capture one or more images from the electro-optical sensor;
perform a two-dimensional (2-D) feature extraction on each of the captured images using local 2-D image feature descriptors;
calculate three-dimensional (3-D) feature locations on the ellipsoid of the Earth surface from the extracted features using a position and attitude of the platform and a model of the electro-optical sensor;
update the 3-D feature locations using digital terrain elevation data (DTED) as a constraint;
match the extracted features with extracted features in the other platform using the updated 3-D feature locations to create a common feature zone;
select a subset of features from the common feature zone;
input the subset of features into each navigation filter;
perform a convergence test on other subsets in the common feature zone; and prune falsely matched features from the common feature zone.

17. The system of claim 16, wherein the first and second platforms comprise two mobile vehicles in motion and in operative communication with each other for collaborative navigation.

18. The system of claim 17, wherein the mobile vehicles comprise a first aircraft at a first altitude and a second aircraft at a second altitude that is different from the first altitude.

19. The system of claim 16, wherein the first and second platforms further comprise one or more aiding sensors in operative communication with the processing unit, the aiding sensors comprising a magnetic sensor, an altimeter, or a global position system receiver.

20. The system of claim 16, wherein the memory unit in each of the first and second platforms is configured to store 3-D feature locations and 2-D feature descriptors.

* * * * *